April 6, 1937.  L. LOEWENSTEIN  2,076,377
APPARATUS FOR MOLDING FROZEN CONFECTIONS
Filed July 31, 1934  4 Sheets-Sheet 2
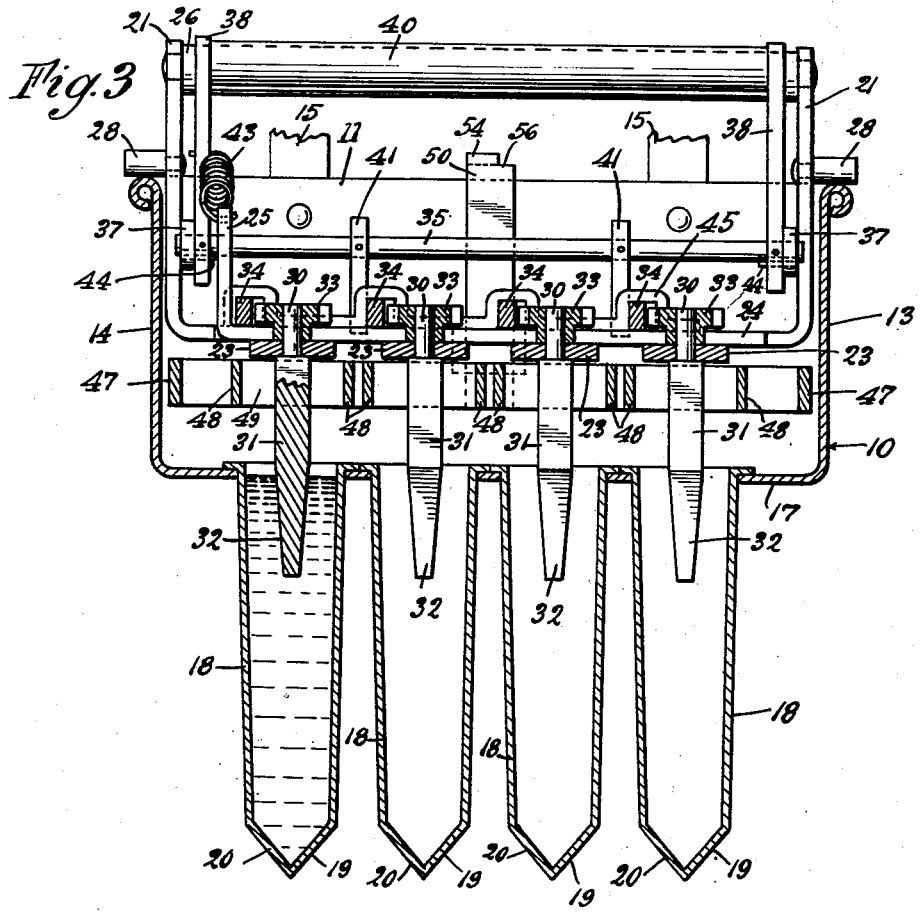
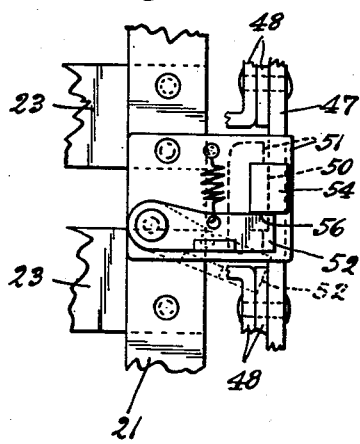
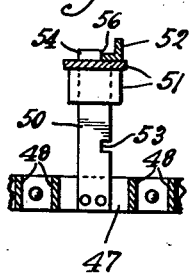
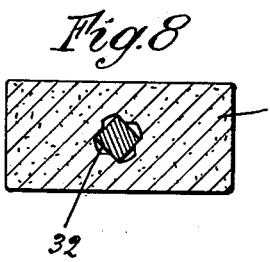
Inventor
Ludwig Loewenstein
by Henry Bleck
Attorney.

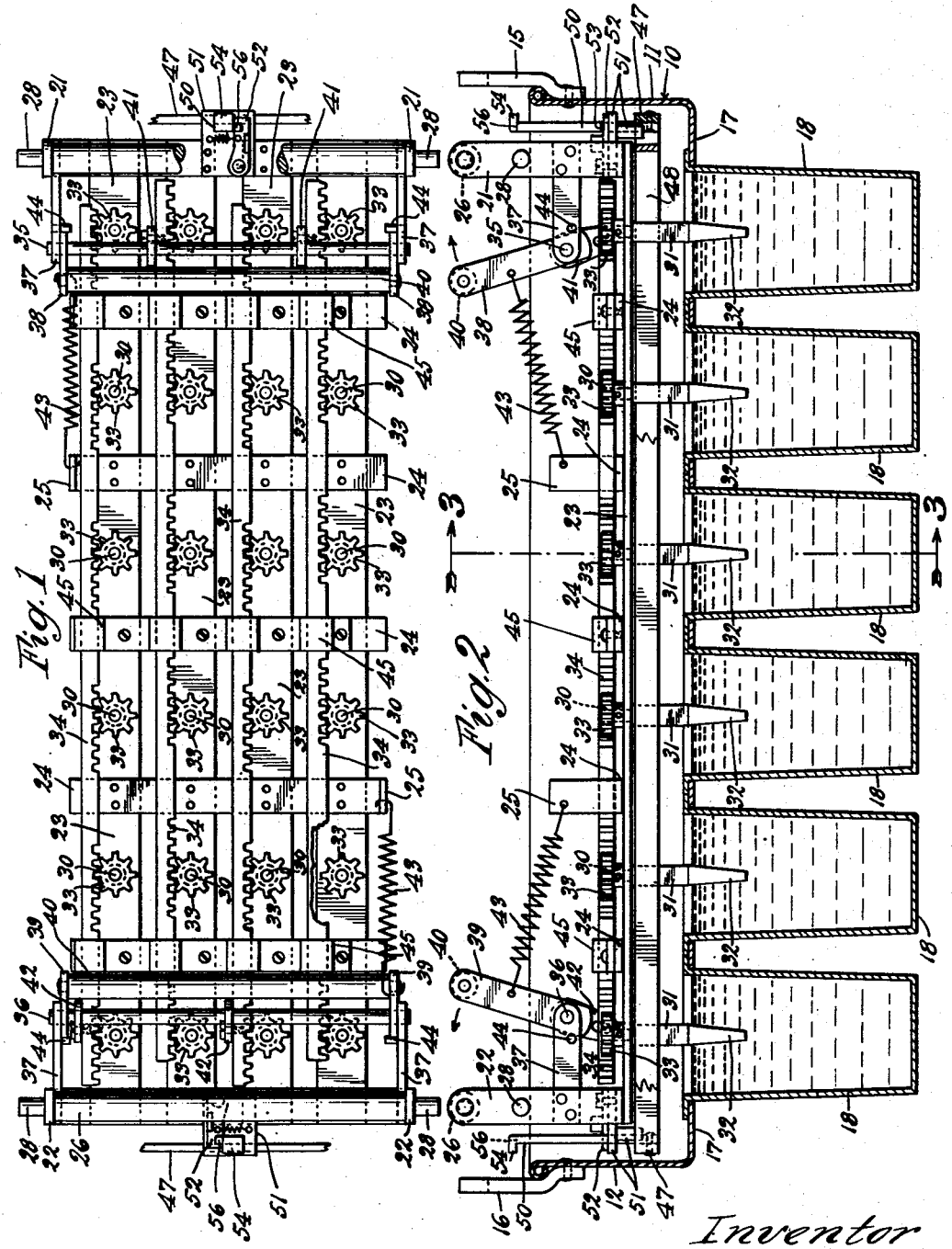

April 6, 1937.  L. LOEWENSTEIN  2,076,377
APPARATUS FOR MOLDING FROZEN CONFECTIONS
Filed July 31, 1934   4 Sheets-Sheet 3
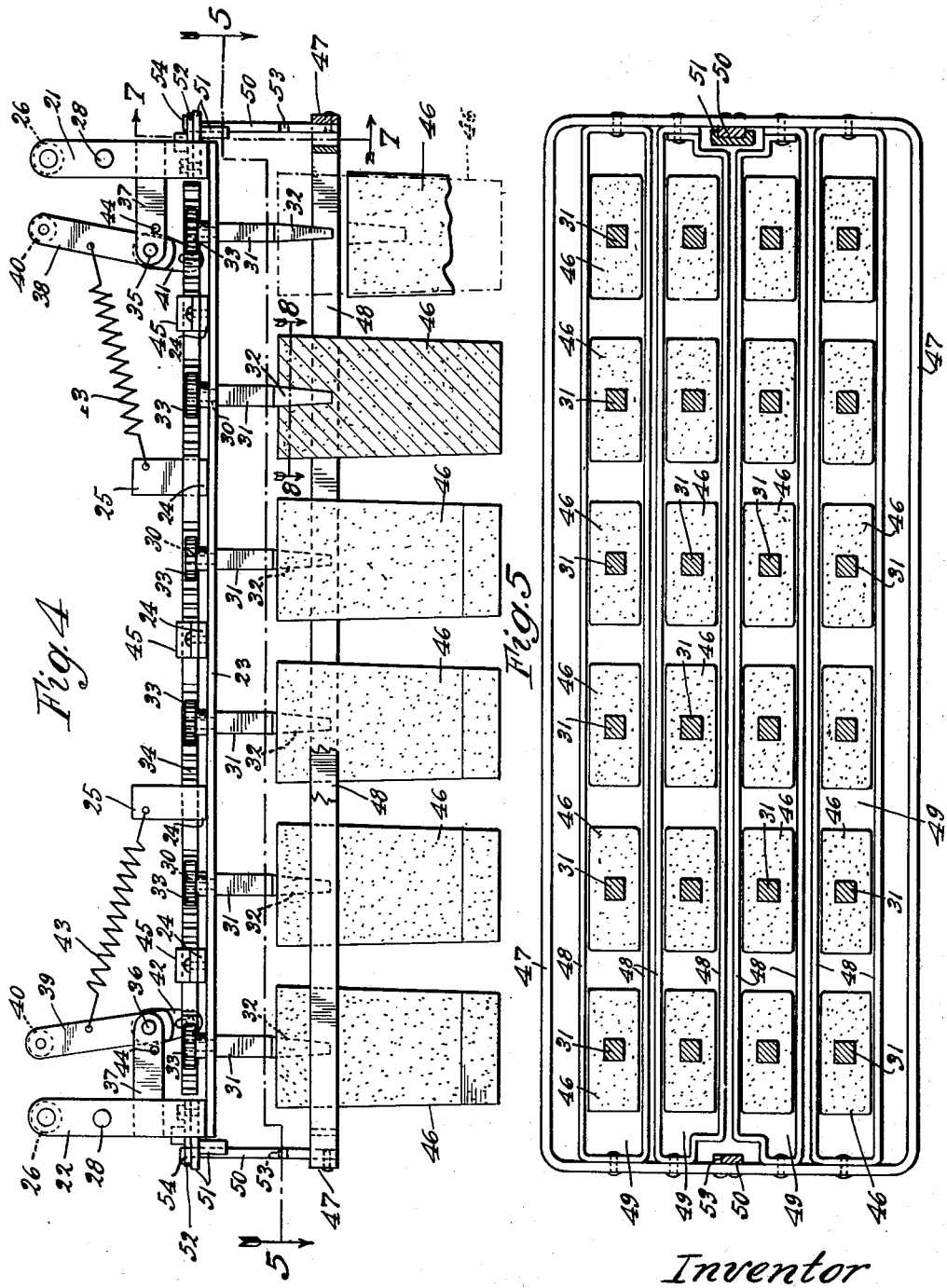
Inventor
Ludwig Loewenstein
by Henry Hesk
Attorney.

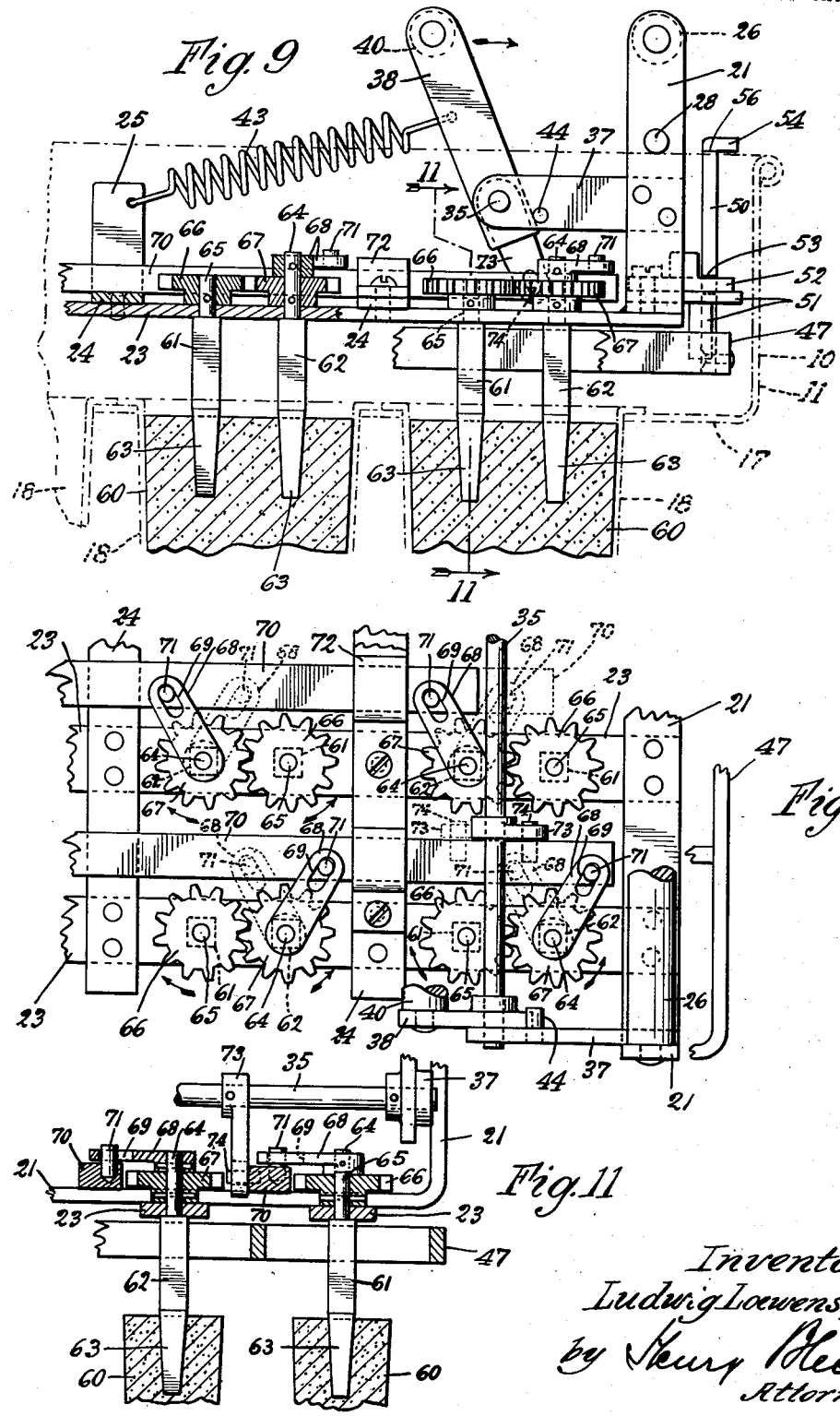

Patented Apr. 6, 1937

2,076,377

UNITED STATES PATENT OFFICE 2,076,377

APPARATUS FOR MOLDING FROZEN CONFECTIONS

Ludwig Loewenstein, Chicago, Ill.

Application July 31, 1934, Serial No. 737,816

3 Claims. (Cl. 107—8)

My invention relates to means for molding frozen confections, and its principal object comprises the provision of a mold for the production of a plurality of frozen confections supported by a carrier to which the confections congeal, so that all of the confections frozen to the carrier may be removed from the mold and from the carrier as a unit.

It is an object of the invention to provide a carrier having pins to which each frozen confection is individually attached by congelation, and to provide means for rotating said pins to break the bond between the frozen confections and the pins.

It is a further object of the invention to provide a carrier for frozen confections which enables the removal of the frozen confection from the mold and the deposit of the confections in the same relative position that the confections occupy in the mold.

It is also an object to provide means for holding the frozen confections when the pins, to which the frozen confections are attached by congelation, are rotated.

Another object aims at providing a plurality of pins for each frozen confection and means for manually rotating said pins for releasing the confections by gravity.

It is still a further object to provide manual operable means for protecting and shielding the individual supporting means to which the confections congeal, when desired.

It is also an object of the invention to provide certain details of construction and arrangement tending to enhance the reliability and utility of a device of the character described.

With these and other equally important objects in view which will become apparent from a perusal of the invention, the latter comprises the means described in the following specification, particularly pointed out in the claims forming a part thereof, and illustrated in the accompanying drawings, in which:

Fig. 1 is a plan view of the invention with parts broken away,

Fig. 2 is a front elevation with parts broken away and parts in section illustrating the carrier inserted in the mold, Fig. 3 is an enlarged section along the line 3—3 of Fig. 2, Fig. 4 is a front elevation of the carrier illustrating the parts in position during discharge of the frozen confections, Fig. 5 is a section along the line 5—5 of Fig. 4, Fig. 6 is an enlarged partial detail view of the locking mechanism, Fig. 7 is a section along the lines 7—7 of Fig. 4, Fig. 8 is an enlarged section along the line 8—8 of Fig. 4, Fig. 9 is a partial front elevation of a variant form with parts broken away and parts in section, Fig. 10 is a partial plan view of the device shown in Fig. 9, and Fig. 11 is a section along the line 11—11 of Fig. 9.

Like parts are designated by like characters throughout the specification and drawings.

Referring to the several views of the drawings, the mold, generally designated by 10, comprises a box-like structure of rectangular cross-section having end walls 11 and 12 and side walls 13 and 14, the end walls having secured thereto, by riveting or in any other suitable approved manner, handles 15 and 16 for the lowering and lifting of the mold.

The bottom 17 of the mold is formed with a number of longitudinal openings, there being six series of four openings parallel to the end wall of the mold box, so that a total of twenty-four openings are provided. However, the number of openings provided may be varied to suit the particular requirements and the number shown in the drawings is merely given by way of example.

In each opening are suspended containers 18, and secured thereto in any suitable manner. The containers are tapered toward the bottom and are provided at the sides with bevelled edges 19 and 20 (Fig. 3) so that the frozen confection may be easily withdrawn from the containers.

In the mold box 10 is inserted a cradle-like frame which comprises U-shaped members 21 and 22 connected by longitudinal bars 23, which in turn are connected by cross bars 24, two of which are formed with upwardly extending portions 25. The upper ends of the U-shaped members 21 and 22 are connected by a round bar 26 constituting a handle bar. Pins or abutments 28, mounted on the U-shaped members 21 and 22, serve to support the cradle structure upon the upper rolled edge of the side walls 13 and 14 of the mold and supports the cradle structure a predetermined distance above the containers 18.

Rotatably mounted in the longitudinal bars 23 are round ends 30 of pins 31, herein shown as square in cross section and tapered at the ends as at 32.

As illustrated in Figs. 2 and 3, the pins 31 depend a sufficient distance to enter the liquid confection in the containers 18, so that, upon the congelation of the confection in each container, it freezes to the tapered end 32 of the pin 31 and is thus rigid therewith.

I have illustrated one pin for each container, however, as illustrated in Figs. 9 to 11, inclusive, a plurality of pins may be employed for each container, particularly, when containers of large capacity are employed.

It will be realized that the pins 31 may be of any other suitable shape and the ends of the pins may be either straight or may be tapered.

The length of the pins may vary depending upon the frozen confection used. Ice cream generally requires a longer pin than water ice.

It is preferable that the pins be no longer nor of greater cross section than required to withdraw the frozen confections from the mold.

Secured to each shaft 30 above the longitudinal members 23 is a gear 33. In mesh with each row of gears 33 are the teeth of rack bars 34.

I have illustrated four rack bars, one for each row of containers and in order to actuate the rack bars 34 and thus rotate the pins 31, I have illustrated the following mechanism:

Mounted upon shafts 35 and 36, supported in bracket members 37 on the U-shaped members 21 and 22, are levers 38 and 39.

Round bars 40 connecting the upper ends of the levers 38 and 39 respectively serve as handles for manual rotating the levers and associated shafts 35 and 36.

Secured on the shaft 35 are links or levers 41 and mounted on the shaft 36 are similar levers 42. Any other suitable means may be provided for the rotation of the pins such as toggle bars or the like.

I have illustrated the links 41 pivotally connected to two rack bars 34 and the links 42 pivotally connected to the two remaining rack bars 34. Springs 43, anchored at one end to the members 25 of the cross bars 24 and their opposite ends anchored to the levers 38 and 39, serve to hold the parts in the positions shown in Fig. 2.

Stop pins 44 on the brackets 37 limit rotation of the levers 38 and 39.

As shown in Figs. 1, 2, and 3, the rack bars 34, resting upon the cross-bars 24, are slidably held in alignment with the gears 33 by guide bars 45 secured by screws to the cross bars 24.

In use, the cradle frame is inserted into a filled mold 10 so that the tapered ends of the depending pins 31 enter the containers 18. After congelation, the containers of the mold are inserted in a bath of hot water which breaks the bond of the frozen confections and the containers.

By means of the handles 26, the carrier frame together with the frozen confections 46 adhering to the pins 31 may be lifted out of the mold and brought to the place where the confections are to be discharged. If desired, the confection may be dipped in chocolate or other coating and permitted to harden. The operator now manually rocks by means of the handle 40 the levers 38 and 39 and there with the associate shafts 35 and 36 illustrated in Fig. 4. By means of the links 41 and 42 the rack bars 34 are moved longitudinally and thus rotate, by means of the gears 33, the pins 31.

I have illustrated the levers 38 actuating two of the racks 34 and the levers 39 actuating the remaining two racks 34 in order to divide the force necessary for rotating said levers to break the bond between the frozen confections 46 and the pins 31.

It is essential that the frozen confections be held against movement when the pins rotate.

Referring to Figs. 4 and 5, a rectangular frame member 47, generally conforming to the contour of the inside of the mold 10, is lowered in the position so indicated.

The frame is provided with parallel longitudinal bars 48 to form channels 49 in which the confections 46 are held during rotation of the pins.

Rectangular member 47 is provided at either end with uprights 50 which are supported in the bearing bars 51 on the U-shaped members 21 and 22 by members of spring thrust latch members 52 engaging slots 53 in the uprights 50 while the rectangular frame is held in its uppermost position as shown in Fig. 2.

When the frame is in its lowermost position, the offset portions 54 on the uprights engage the bearing members 51. The latch members 52 are then engaging a cutout portion 56 of the uprights 50 and thus prevent upward movement of the frame 47. When the frame is in the uppermost position, it is only necessary to rotate the latch members 52 in the dotted line position and the frame drops by gravity. Any other suitable means may be employed to raise, lower and lock the frame 47.

It will be realized that the rectangular frame 47, when in its lowermost position serves as a protecting means for the tapered ends of the pins 31 when the carrier is being washed, stored or when handled.

In the modified form illustrated in Figs. 9 to 11, I have illustrated a plurality of pins engaging each confection 60. As an example, I have illustrated two pins 61 and 62, tapered at the ends as at 63 and provided with a stub shaft 64 and 65 respectively, projecting through an aperture in the bars 23. Pinned or otherwise secured to the shaft 64 is a gear 66 which is in mesh with a gear 67 mounted on the shaft 64.

Rigidly connected with each shaft 64 is a lever 68 slotted as at 69 to receive a pin 71 on the sliding bars 70. The bars 70 supported on the cross members 24 are held in alignment by means of any suitable bearing member 72, similar in shape to the guide bar 45. In order to impart longitudinal movement to the bar 70, I provide a connecting link 73 fastened to the shaft 35 or to the shaft 36 which is slotted to receive and engage a pin 74 to obtain a driving connection for bar 70.

Manual means for rotating the pins 61 and 62 are identical as previously described and are numbered accordingly.

In this form, it is not necessary to hold the frozen confection 60 against movement but in order to provide a protection for the depending pins 61 and 62, when the carrier is handled during washing or for storing, I may employ a rectangular frame 47 as previously described.

However, it is not necessary to use any of the parallel members 48.

While the drawings show preferred embodiments of the invention, numerous changes, alterations, revisions and modifications may be made without departing from the scope of the invention.

I, therefore, do not wish to limit myself to the details of construction or arrangement of parts, as shown, but claim my invention as broadly as the state of the art permits.

I claim:

1. In a confection molding device, a mold having a plurality of mold cavities, a portable carrier supported above said mold cavities, pins depending from said carrier into said mold cavities to have the confections congeal thereon, means for rotating said pins to break the bond with the confections, and means for holding the confections against movement during the rotation of said pins, said holding means constituting a guard for the free pin ends.

2. In a confection molding device, a mold having a plurality of mold cavities, a portable carrier supported above said mold cavities, pins depending from said carrier into said mold cavities to have the confections congeal thereon, gears on said pins, and rack bars in mesh with said gears and movable longitudinally to cause rotation of said pins.

3. In a confection molding device, a mold having a plurality of mold cavities, a portable carrier supported above said mold cavities, pins depending from said carrier into said mold cavities to have the confections congeal thereon, gears on said pins, rack bars in mesh with said gears and movable longitudinally to cause rotation of said pins, and means for securing the confections against movement during rotation of said pins.

LUDWIG LOEWENSTEIN.